No. 685,189. Patented Oct. 22, 1901.
J. B. TITTLE.
NUT LOCK.
(Application filed Aug. 17, 1901.)
(No Model.)
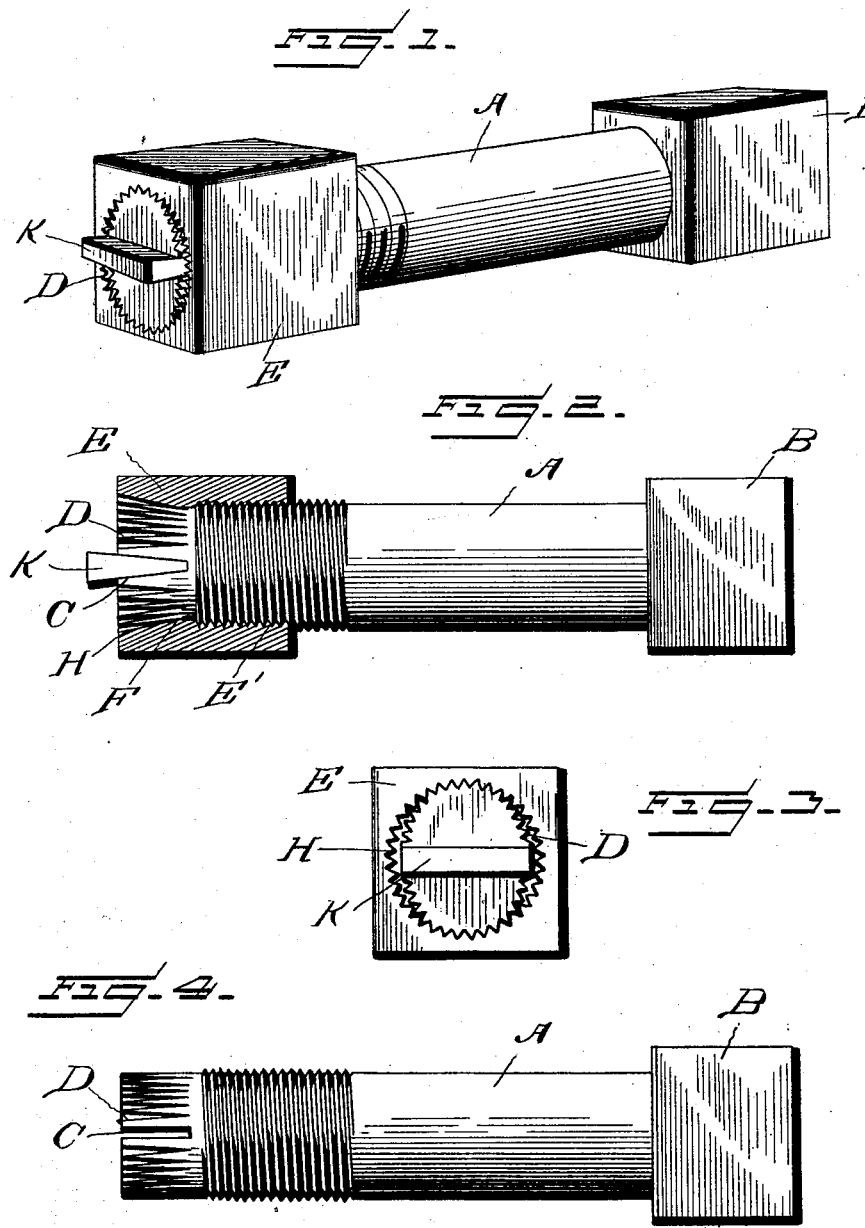

UNITED STATES PATENT OFFICE.

JOHN B. TITTLE, OF DEFIANCE, OHIO.

NUT-LOCK.

SPECIFICATION forming part of Letters Patent No. 685,189, dated October 22, 1901.

Application filed August 17, 1901. Serial No. 72,397. (No model.)

*To all whom it may concern:*

Be it known that I, JOHN B. TITTLE, a citizen of the United States, residing at Defiance, in the county of Defiance and State of Ohio, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks, and especially to the provision of a bolt having a slotted end which is adapted to be expanded by means of a key, said bolt being provided with the usual circumferential threads and longitudinal grooves, and the provision of a nut which is interiorly threaded and having a beveled portion leading to the threads, thus allowing a space within which the slotted end of the bolt is allowed to expand when the key is driven in the end of the bolt.

The invention will be hereinafter more fully described and then specifically defined in the appended claims and illustrated in the accompanying drawings, which, with the letters of reference marked thereon, form a part of this application, and in which drawings—

Figure 1 is a perspective view of my invention, showing a nut locked to the bolt. Fig. 2 is a central longitudinal section through the nut on a bolt, the latter being shown in elevation. Fig. 3 is an end view of the locked nut. Fig. 4 is a view of the bolt with the nut removed, showing the longitudinal grooves and the slot in the end of the bolt.

Reference now being had to the details of the drawings by letter, A designates a bolt having a head B, and the shank portion of the bolt is threaded in the usual manner, said threads, however, terminating at a location somewhat in from the end of the bolt. The end of the bolt is slotted at C and about the circumference of the bolt outside of the threaded portion has a series of grooves D, which are wedge-shaped and taper to a point rearwardly toward the screw-threaded portion of the bolt.

The nut E has interior threads E', which terminate at the inner margin of the beveled portion F, which beveled portion has a series of grooves H, which correspond to the longitudinal grooves about the end of the bolt.

K designates a key which may be any particular shape and adapted to be driven into the slot in the end of the bolt after the nut has been adjusted in place for the purpose of expanding in opposite directions the slotted end of the bolt. As the wedge is driven in the slot the portions of the bolt on either side thereof will be thrown laterally and allowed to engage the grooves in the beveled portion of the bore of the nut, thus making it impossible to remove the nut while the split portions of the bolt are in their expanded positions, thus making a secure lock for the nut.

When it is desired to remove the nut, the key is first withdrawn from the slot in the end of the bolt, after which the bolt may be unscrewed by means of a suitable wrench, the sections of the bolt yielding under the pressure of the unscrewing-nut, allowing the same to be readily removed.

While the drawings show the nut as flush with the end of the bolt, it will be understood that when the bolt is made of a non-elastic metal the nut must be screwed onto the bolt far enough to allow the expanded end of the bolt to be gripped with nippers when it is desired to remove the nut. When the bolt is made of such non-elastic material, of course after the end is expanded there would be no use of retaining the wedge-shaped key, as illustrated.

Having thus described my invention, what I claim to be new, and desire to secure by Letters Patent, is—

1. A nut-lock comprising a bolt having a slotted end, a key adapted to engage said slot, threads about the bolt terminating at a location adjacent to the space for the slot, the circumference of the slotted portion having longitudinal grooves extending between the threaded portion and the end of the bolt, combined with a nut interiorly threaded to engage the threads of said bolt, and having a series of longitudinal grooves in a tapering portion of the bore of the nut, as set forth.

2. A nut-lock comprising a bolt having a threaded portion and slotted at its end, the threads of the bolt terminating at the base of the slot, a series of tapering grooves about the circumference of the bolt between the threaded portion and the end thereof, combined with the nut which is interiorly threaded, a portion of the bore of the nut being tapered, and a series of longitudinal tapering grooves in the beveled wall of the bore conforming to the grooves at the end of said bolt, and a key adapted to engage the slotted end of the bolt to expand the same, as set forth.

In testimony whereof I hereunto affix my signature in presence of two witnesses.

JOHN B. TITTLE.

Witnesses:
GEORGE T. FARRELL,
W. A. SCHMALTZ.